April 13, 1954 W. C. HALE, JR 2,674,754

SHANK SLOTTING MACHINE

Filed Nov. 18, 1949 7 Sheets-Sheet 1

WITNESSES

A. J. Brittingham

Hubert Fuchs

INVENTOR:
William C. Hale, Jr.,

BY Paul & Paul

ATTORNEYS.

April 13, 1954 W. C. HALE, JR 2,674,754

SHANK SLOTTING MACHINE

Filed Nov. 18, 1949 7 Sheets-Sheet 2

INVENTOR:
William C. Hale, Jr.,
BY Paul & Paul
ATTORNEYS.

April 13, 1954 W. C. HALE, JR 2,674,754

SHANK SLOTTING MACHINE

Filed Nov. 18, 1949 7 Sheets-Sheet 3

INVENTOR:
William C. Hale Jr.,
BY Paul & Paul
ATTORNEYS.

April 13, 1954 W. C. HALE, JR 2,674,754

SHANK SLOTTING MACHINE

Filed Nov. 18, 1949 7 Sheets-Sheet 4

WITNESSES

A. J. Brittingham

Hubert Fuchs

INVENTOR:

William C. Hale Jr.,

BY Paul & Paul

ATTORNEYS.

April 13, 1954 W. C. HALE, JR 2,674,754

SHANK SLOTTING MACHINE

Filed Nov. 18, 1949 7 Sheets-Sheet 5

INVENTOR:
William C. Hale, Jr.,

BY Paul & Paul

ATTORNEYS.

April 13, 1954 W. C. HALE, JR 2,674,754

SHANK SLOTTING MACHINE

Filed Nov. 18, 1949 7 Sheets-Sheet 6

WITNESSES

A. J. Brittingham

Hubert Fuchs

INVENTOR:

William C. Hale, Jr.,

BY Paul & Paul

ATTORNEYS.

April 13, 1954

W. C. HALE, JR 2,674,754

SHANK SLOTTING MACHINE

Filed Nov. 18, 1949

7 Sheets-Sheet 7

WITNESSES
A. J. Brittingham
Hubert Fuchs

INVENTOR:
William C. Hale, Jr.,

BY Paul & Paul

ATTORNEYS.

Patented Apr. 13, 1954

2,674,754

UNITED STATES PATENT OFFICE 2,674,754

SHANK SLOTTING MACHINES

William C. Hale, Jr., Chester, Pa., assignor to South Chester Corporation, Chester, Pa., a corporation of Delaware Application November 18, 1949, Serial No. 128,055

18 Claims. (Cl. 10—20.5)

This invention relates to milling machines, that is to say, to machine tools useful in performing crosswise grooving or slotting operations upon various articles such as screw bolts, nuts and rivets, as well as upon other types of fastening devices including the kind disclosed in U. S. Patent No. 2,470,924 granted to H. A. Flogaus on May 24, 1949. The invention is particularly adapted to forming cross-slots or cross-grooves in the ends opposite the heads of such articles.

The chief aim of my invention is to provide a milling machine suitable for carrying out work is the sort referred to, which is simple in construction; which is reliable in its performance; which can be readily adapted, by interchange of certain parts and by adjustment of others, to cut either one or various numbers of crosswise intersecting slots in the articles to any desired depth; which will carry out such operations on the end opposite the heads of such articles; which can be operated at high speeds with consequent attainment of a corresponding large output therefrom; and which, moreover, requires but a minimum of power to drive it.

How the foregoing as well as other important objects and advantages are realized in practice will appear from the following detailed description of the attached drawings, wherein Fig. 1 is a view in top plan of a milling machine conveniently embodying my invention.

Fig. 18 shows the inverted plan of an intermittently rotated carrier disk by which the rivets are supported during the slotting in.

Figure 1:
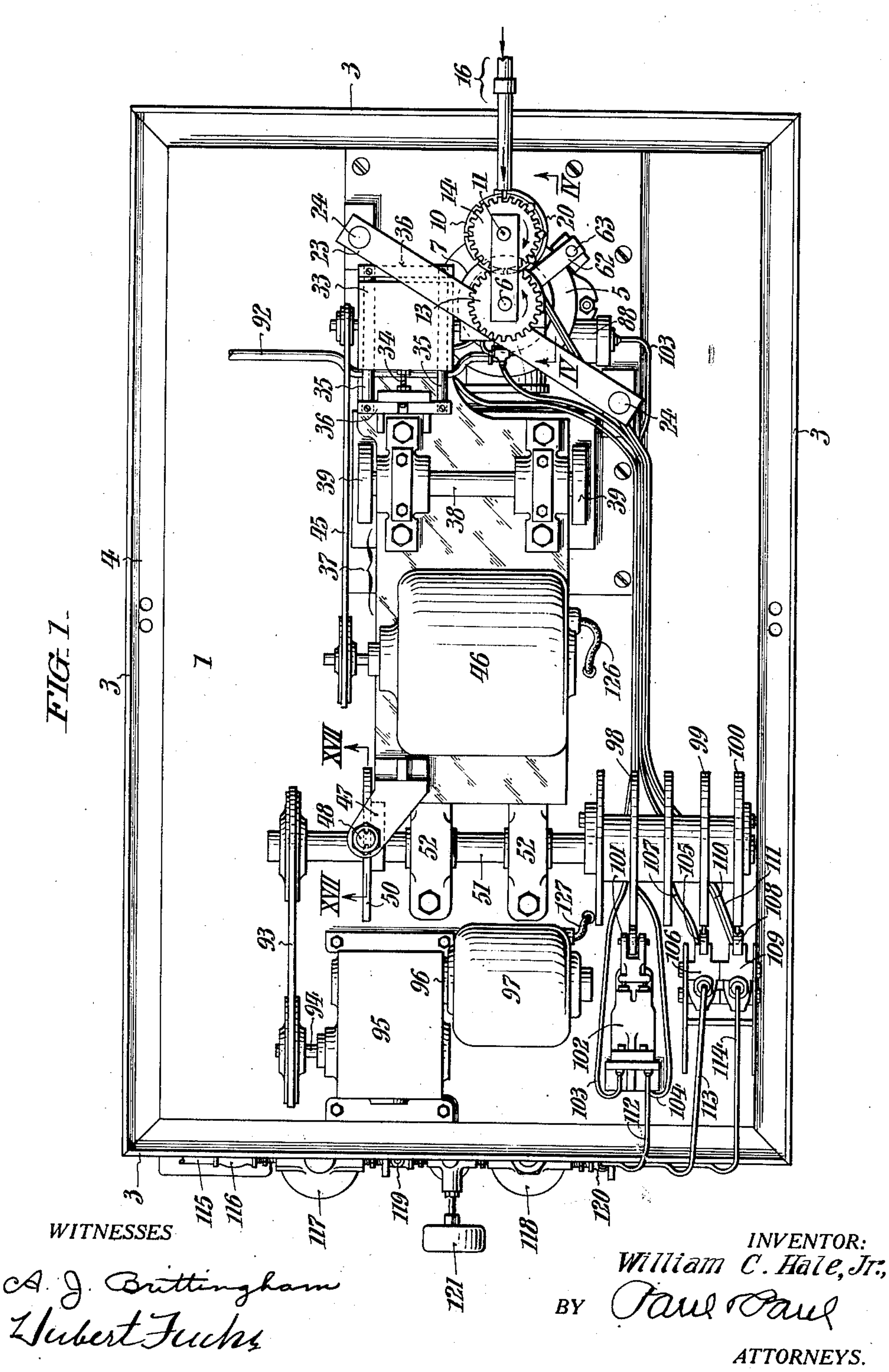
Figures 2, 9, 10, 11, 24, 25:
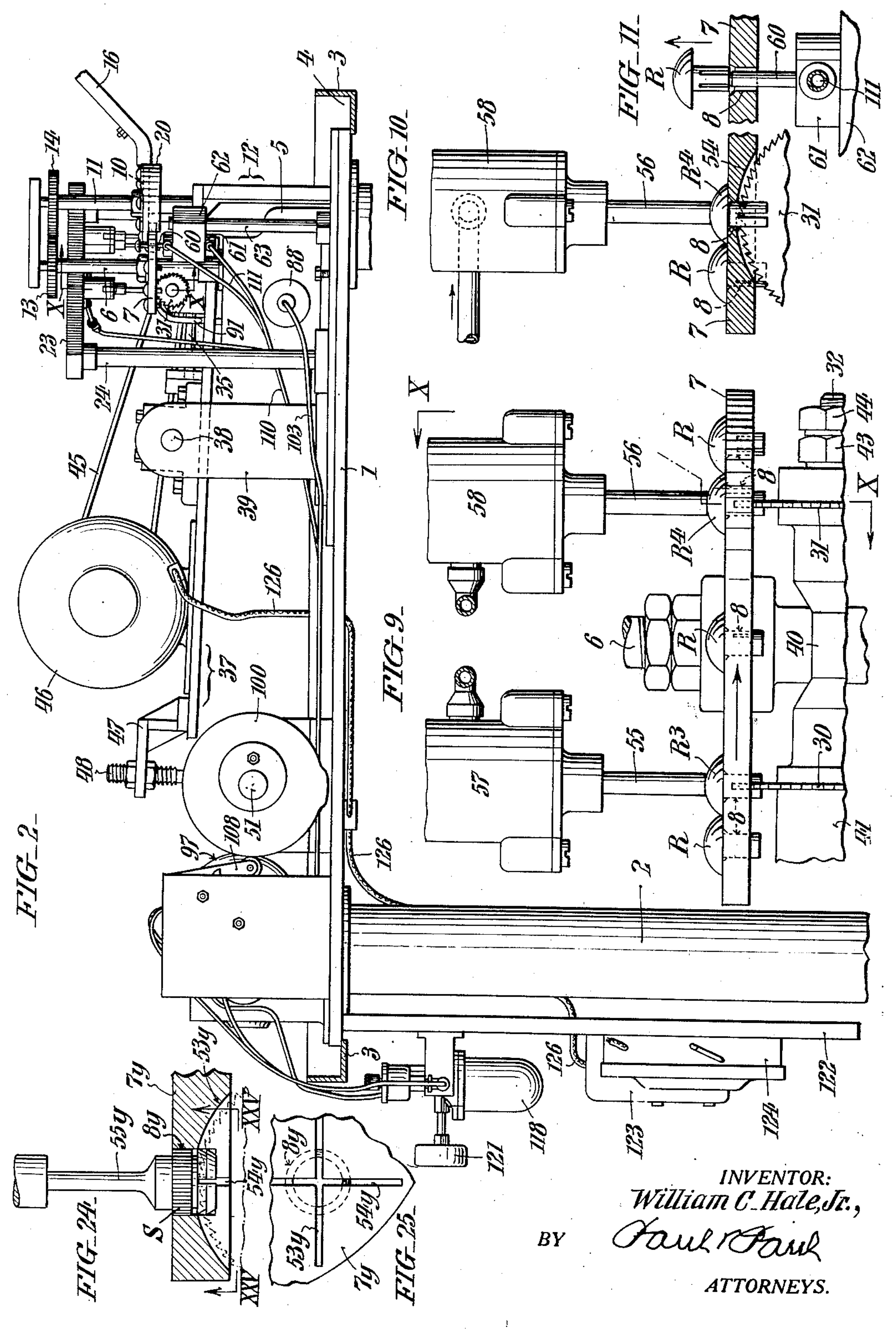
Fig. 2 is a fragmentary view in side elevattion with portions of its supporting structure broken away and others shown in section.
Fig. 9 is a fragmentary view in elevation looking as indicated by the angled arrow IX—IX in Fig. 4.
Fig. 10 is a view partly in elevation and partly in cross section looking as indicated by the angled arrows X—X in Figs. 2 and 9.
Fig. 11 is a fragmentary sectional view taken as indicated by the angled arrow XI—XI in Fig. 5.
Fig. 24 is a fragmentary detail view in section corresponding to Fig. 10 and showing a modified carrier disk.
Fig. 25 is a fragmentary view showing the carrier disk of Fig. 24 in bottom plan.
Figure 3:
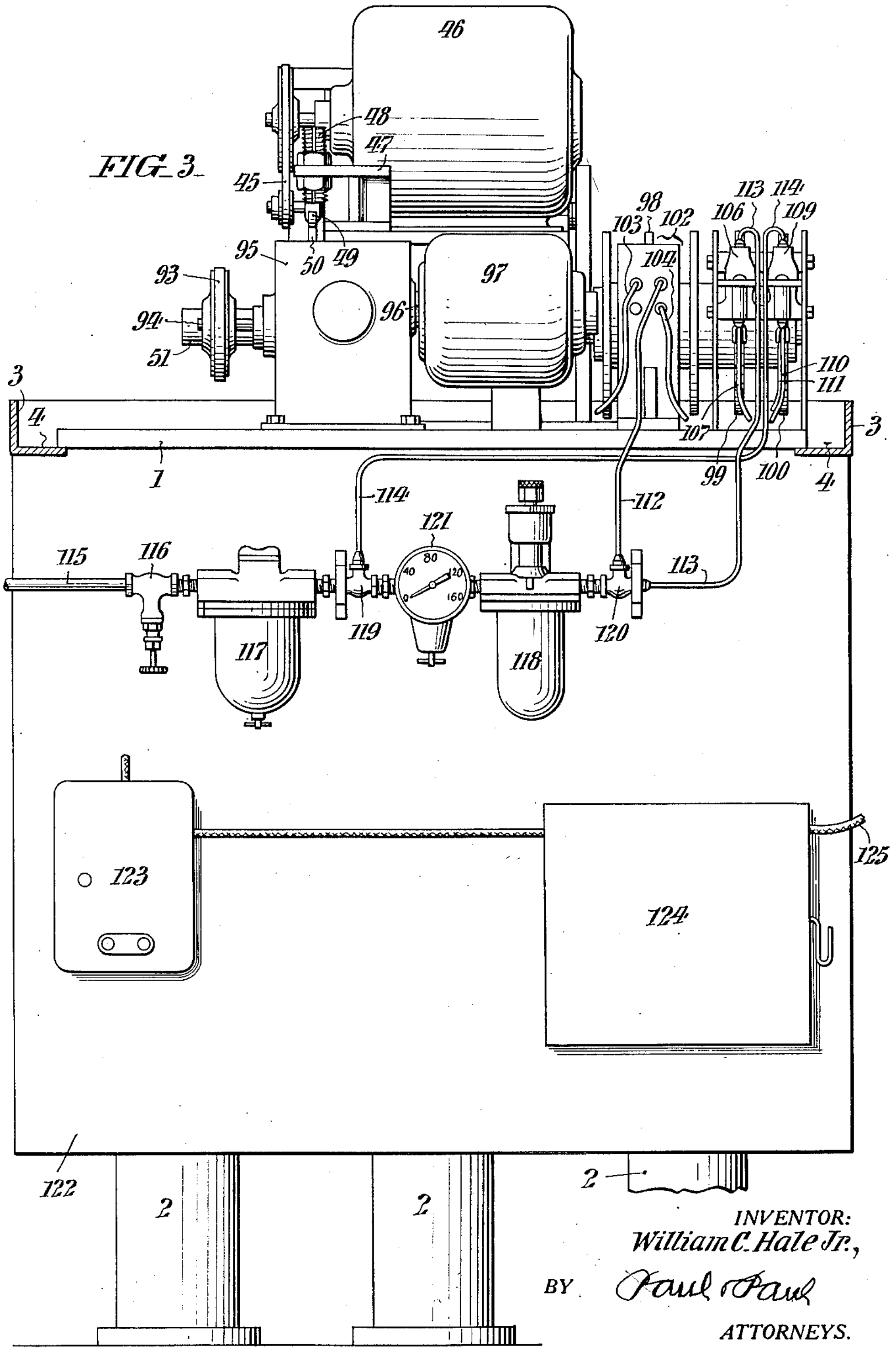
Fig. 3 is an end view of the machine as seen from the left of Figs. 1 and 2.

With more specific reference first to Figs. 1–3, it will be observed that, as herein exemplified, the substructure of my improved milling machine is in the form of an oblong table with its top 1 supported by tubular legs 2. Miter jointed angle section strips 3 are affixed along the edges of the table top with their horizontal flanges underlapping to provide a perimetric catch gutter 4 for collecting the drops of coolant sprayed upon the articles and the saws during the slotting as later explained. Fixedly supported on the table, at one end, is an indexing mechanism whereof the intermittently rotating shaft 6 extends upward through the top of the housing of said mechanism.

Figures 4, 5, 6, 7, 8:
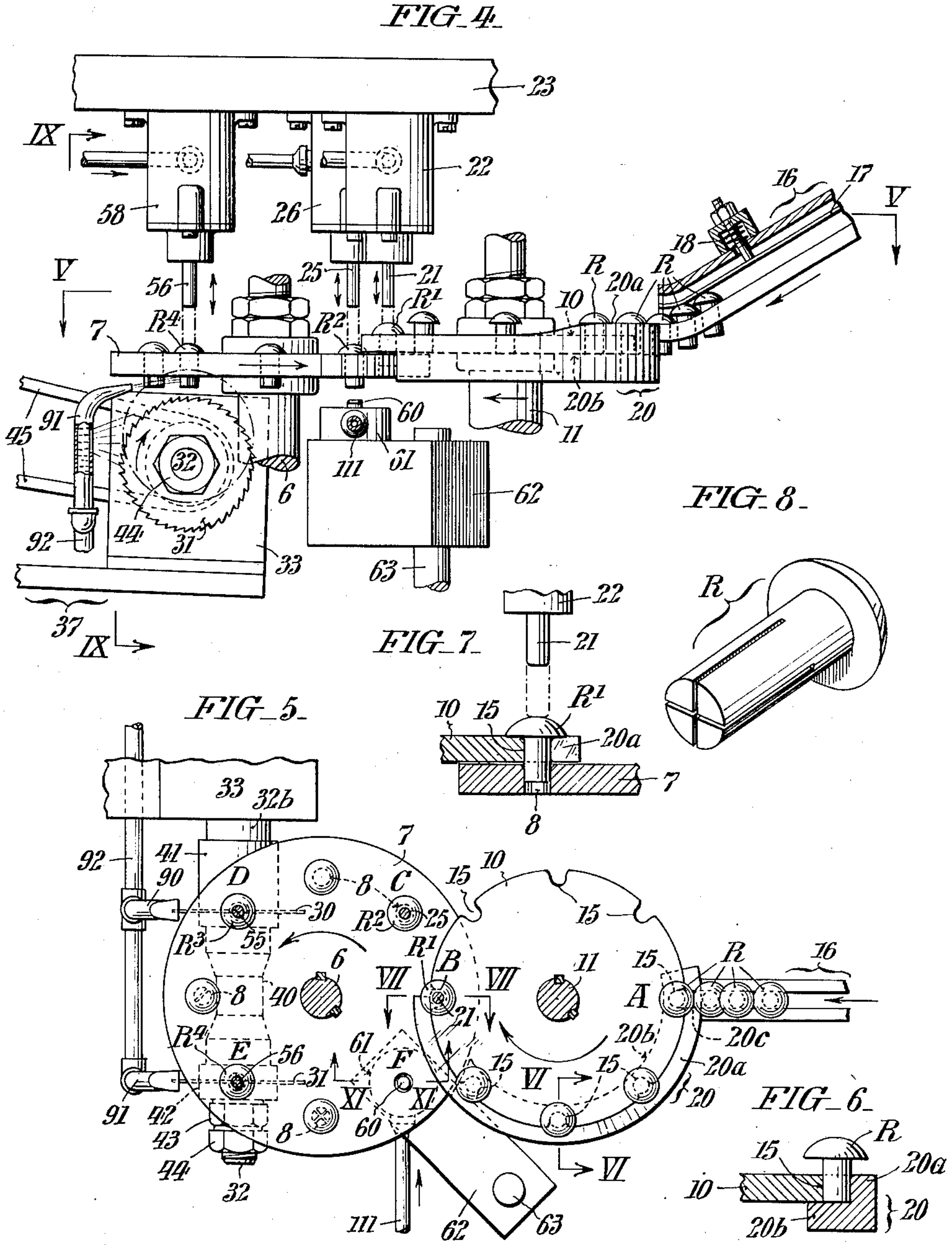
Fig. 4 is a large scale fragmentary view in side elevation corresponding to Fig. 2 and looking as indicated by the angled arrows IV—IV in Fig. 1.
Fig. 5 is a framentary view in horizontal section taken as indicated by the angled arrows V—V in Fig. 4.
Figs. 6 and 7 are fragmentary detailed views taken as respectively indicated by the angled arrows VI—VI and VII—VII in Fig. 5.
Fig. 8 is a perspective view of a rivet with two crossed slots in its shank such as can be cut in the machine.
Figure 18:
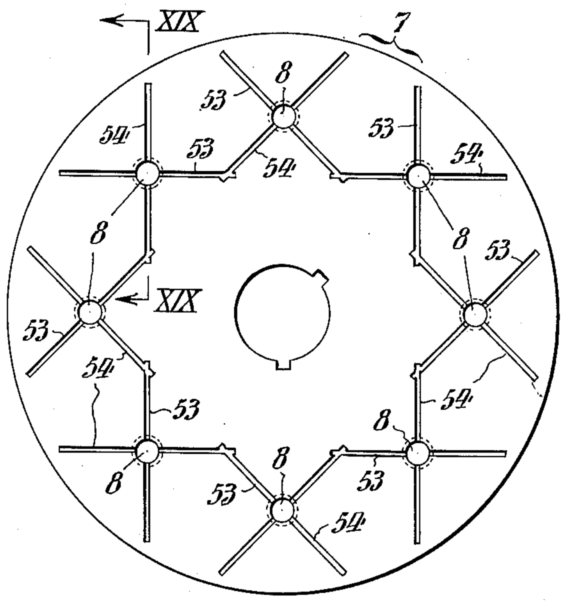

Secured to the shaft 6 at an elevation above the housing 5 is a carrier disk 7 having an annular series of equally spaced apertures 8 (in this instance eight), see Figs. 5 and 18, of a diameter to freely receive the shanks of headed articles such as rivets designated R. Arranged in partially overlapping relation to the carrier disk 7 is a transfer disk 10 which is affixed to vertical shaft 11 rotatively supported in a bracket 12 upstanding from the table top 1, see Fig. 2, the latter shaft being intermittently rotated in unison with the shaft 7, but in the opposite direction, through movement imparted thereto by the intermeshing gears indicated at 13 and 14. As shown in Fig. 5, the transfer disk 10 is provided in its peripheral edge with equally spaced notches 15 corresponding in size and number with the apertures 8 in the carrier disk 7, and adapted to register with said apertures successively at a transfer point B at the termination of each rotary shift of the two disks. It is to be understood that, at each actuation, the disks 7 and 10 are rotated through an octant in correspondence with the spacing of the apertures and notches respectively in them. The rivets R are fed to the machine, single file and upright, with their heads uppermost, at a station A, from a source of supply (not illustrated), through an inclined gravity chute 16, each of them being pushed by the weight of those behind it so that its shank is entered laterally into one of the notches 15 in the transfer disk 10 during each rest period of the two disks. In their descent through the chute 16, the rivets are restricted by guard plate 17 which is urged downward by a light spring 18, its position being regulatable by a nut on the upwardly protruding end of a supporting screw stud. The purpose of this guard is to restrict the interval traversed by the heads of the rivets to insure their ultimate release in upright position. Arranged adjacent the transfer disk 10, at one side thereof, is a segmental guard 20 with an upright flange 20*a* with a downwardly receding top cam edge which extends from the delivery end of the chute 16 at the feeding station A to the delivery station B as shown in Figs. 4 and 5, to keep the rivets lodged in the notches 15 during the transfer. The guard 20 is provided at 20*c* with a crosswise notch for clearance of the rivet shanks in the passage of the rivets from the chute 17 into the notches of said disk at the feeding station A. The guard 20 also has an inwardly-directed lateral flange 20*b*, Figs. 4–6, upon which the shanks of the rivets R are adapted to rest enroute to the carrier disk 7. It is to be especially noted from Fig. 4 that, at the delivery end, the bottom rails of the chute 16 are flush with the top of the high portion of the upright flange 20*a* of the guard 20, so that the rivets are temporarily suspended by their heads with their shank bottoms just clearing the top of the guard flange 20*b* to facilitate entry of the shanks into the notches 15 of the disk 10 at the feeding station A. During advance of the rivets, the heads slide down the cam incline of the upright flange 20*a* of the guard 20 until they eventually contact the top of the guard flange 20*b* before they reach the transfer station B. As before stated, the lateral flange 20*b* of the guard 20 terminates at the periphery of the carrier disk 7 while, as shown in Fig. 5, the upright flange 20*a* is extended over said disk to insure retainment of the rivets until they reach the transfer station B. At the transfer station B, each rivet is freed to drop for entry of its shank into the registering aperture 8 in the carrier disk 7, the extent of the drop being limited by encounter of the rivet head with the flange 20*a* which, at said station, is flush with the top of the transfer disk 10. In the event that the rivet should fail to drop at the station B, it will be depressed by a normally elevated plunger 21 which is actuated by a pressure fluid cylinder 22 pendently supported from a plate 23 sustained by posts 24 on the table top 1. As the disks are rotatively shifted by one step, the edge of the transfer disk 10 will eventually pass from beneath the head of the rivet R′ delivered at the transfer B, with the result that said rivet may drop further until its head rests on the carrier disk 7 with its shank protruding at the bottom of the latter at the station C. Here again, if the rivet should stick, it will be fully depressed by another plunger 25 actuated by a separate fluid pressure cylinder 26 supported, with the cylinder 22, from the cross bar 23.

Figure 20:
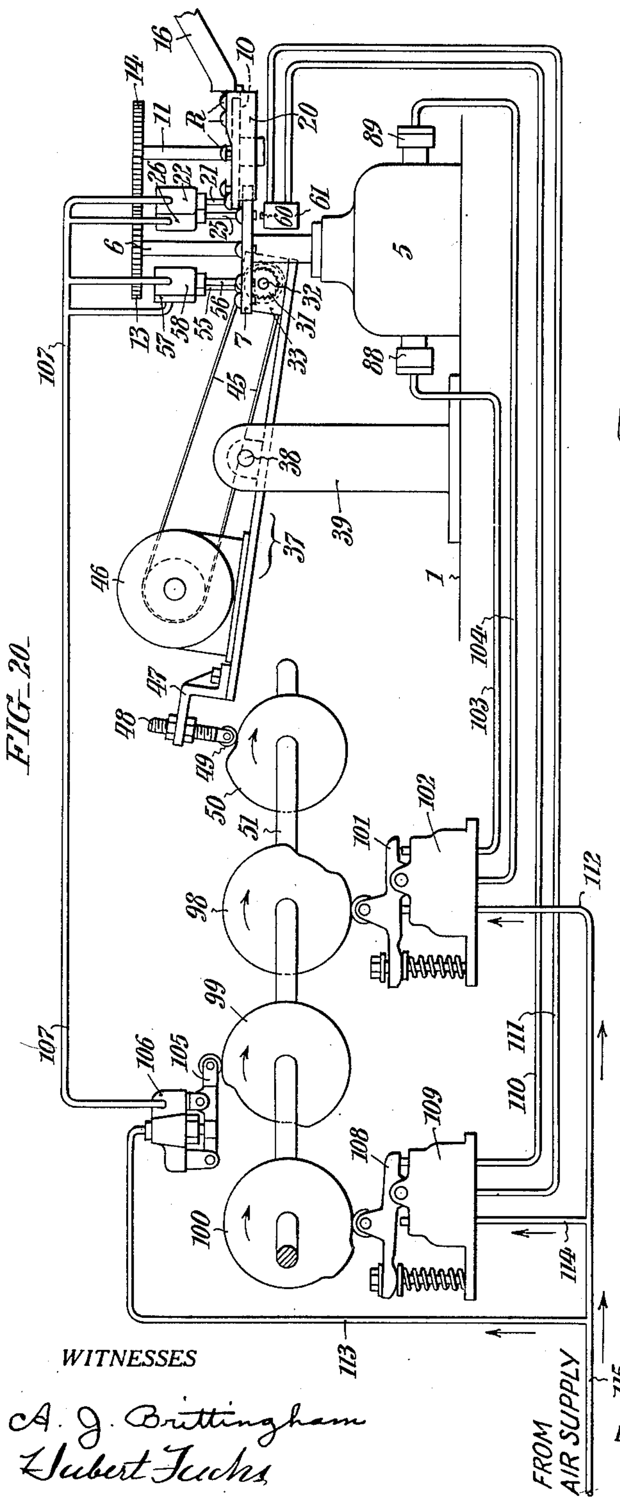
Fig. 20 is a diagrammatic view corresponding generally to Fig. 2 showing how the various motions neceessary during each operative cycle of the machine are controlled and timed.
Figure 17:
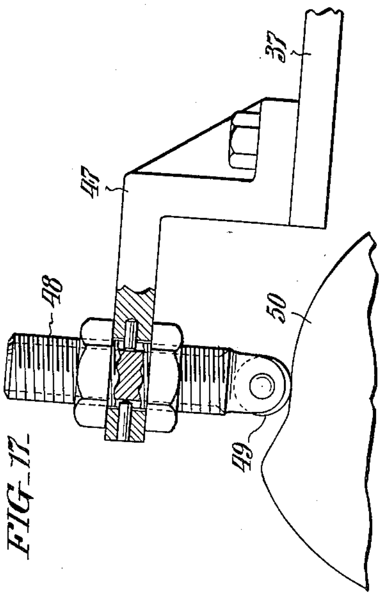
Fig. 17 is a fragmentary view partly in side elevation and partly in section taken as indicated by the angled arrows XVII—XVII in Fig. 1.
Figure 16:
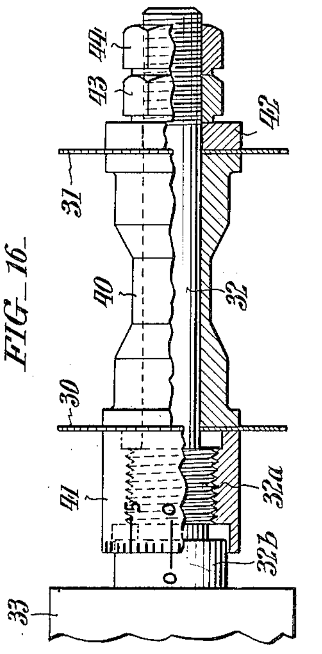
Fig. 16 is a framentary view partly in elevation and partly in axial section of a rotary saw means by which slots are concurrently cut into the shanks of two different articles.
Figure 19:
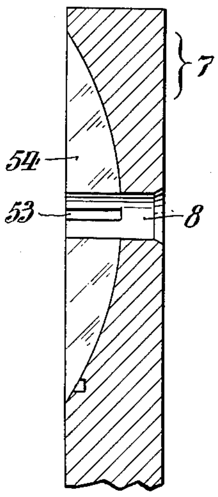
Fig. 19 is a fragmentary detailed section drawn to a larger scale taken as indicated by the angled arrows XIX—XIX in Fig. 18.

Disposed in parallel relation below the carrier disk 7 at stations D and E are two constantly driven rotary circular saws 30 and 31. As shown in Figs. 1 and 2, these saws are mounted upon a shaft 32 rotatively supported in a bearing block 33 (Fig. 1), which, by a screw means at 34, is adjustable along parallel rods 35 extending between laterally spaced supports 36 at one end of a rocker beam 37. Intermediate its ends, the beam 37 is fulcrumed on a transverse shaft 38 journalled in bearing brackets 39 upstanding from the table top 1. As best shown in Fig. 16, the saws 30 and 31 are definitely spaced by a sleeve 40 surrounding the shaft 32, and held against the opposite ends of said sleeve by collars 41 and 42 respectively. The collar 41 is screw engaged with a threaded enlargement 32*a* of shaft 32, and provided with circumferential graduations for coordination with a marker on an adjacent portion 32*b* of said shaft. The collar 42 fits the shaft 32 loosely and is backed by a pair of nuts 43 and 44 engaged with threads at the distal end of said shaft. By this arrangement, the saws 30 and 31 are fixedly clamped to the shaft 32 with capacity for adjustment longitudinally thereof so that they can be accurately aligned in the axes of the rivets $R^3$ and $R^4$ temporarily detained at the stations D and E in Fig. 5. Such adjustment is accomplished by first backing off the nuts 43 and 44, then turning the threaded collar 41 in one direction or the other as may be required, and finally re-tightening said nuts to clamp the assemblage securely for rotation with the shaft 32. The scale registration on the collar 41 is noted and the latter re-set upon each replacement of the saws, after they are worn, by new ones. The saw shaft 32 is driven, through a belt connection 45, from an electric motor 46 mounted on the rearward extremity of the beam 37. Adjustably set in a bracket 47 at the rear end of the beam 37 is a screw stud 48 with a roller 49 (Figs. 17 and 20) at its lower end which roller rides on the periphery of a rotary cam 50 affixed to a transverse timing shaft 51 rotatively supported in laterally spaced bearings 52 on table 1. Normally, the saws 30 and 31 occupy the depressed position in which they are shown in Fig. 4, but upon actuation of the beam 37 during the dwell periods of the disks 7 and 10, they are elevated to the position shown in broken lines to cut the slots in the rivets $R^3$ and $R^4$ temporarily arrested at the stations D and E. In this connection it is to be noted from Figs. 18 and 19 that the carrier disk 7 is provided in its bottom with pairs of saw clearing grooves 53 and 54 which intersect at right angles in the axes of the apertures 8 and which are diagonally disposed with respect to radii through said axes. As a consequence, saw cuts can be made to a very considerable depth into the shanks of the rivets R, the depth being regulatable by adjusting the roller stud 48 at the rear end of the beam 37 as will be readily understood from Figs. 2 and 17. During the slotting at the stations D and E, the rivets $R^3$ and $R^4$ are restrained against rising in the apertures of the carrier disk 7 by hold down plungers 55 and 56 respectively actuated by pressure fluid cylinders 57 and 58 also supported with the cylinders 22 and 26 from the bar 23.

After slotting of their shanks, the rivets are successively displaced from the apertures of the carrier disk 7 at a station F, beyond the saw 31 in the direction of rotation of the said disk, by an ejector means which, shown in Figs. 2, 4, 5, 11 and 15, comprises a plunger 60 and an operating cylinder 61 therefor supported by an arm 62 at the top of another post 63 upstanding from the table top 1. Normally, the plunger 60 is retracted as in Fig. 15, but upon admission of pressure fluid into the bottom of the cylinder 61 beneath the piston 64 whereto it is secured, is thrust upwardly as in Fig. 11 to lift the slotted rivet clear of the carrier disk 7 for removal, as for example, by a blast of air directed upon it by means not illustrated.

Figures 12, 13, 14, 15:
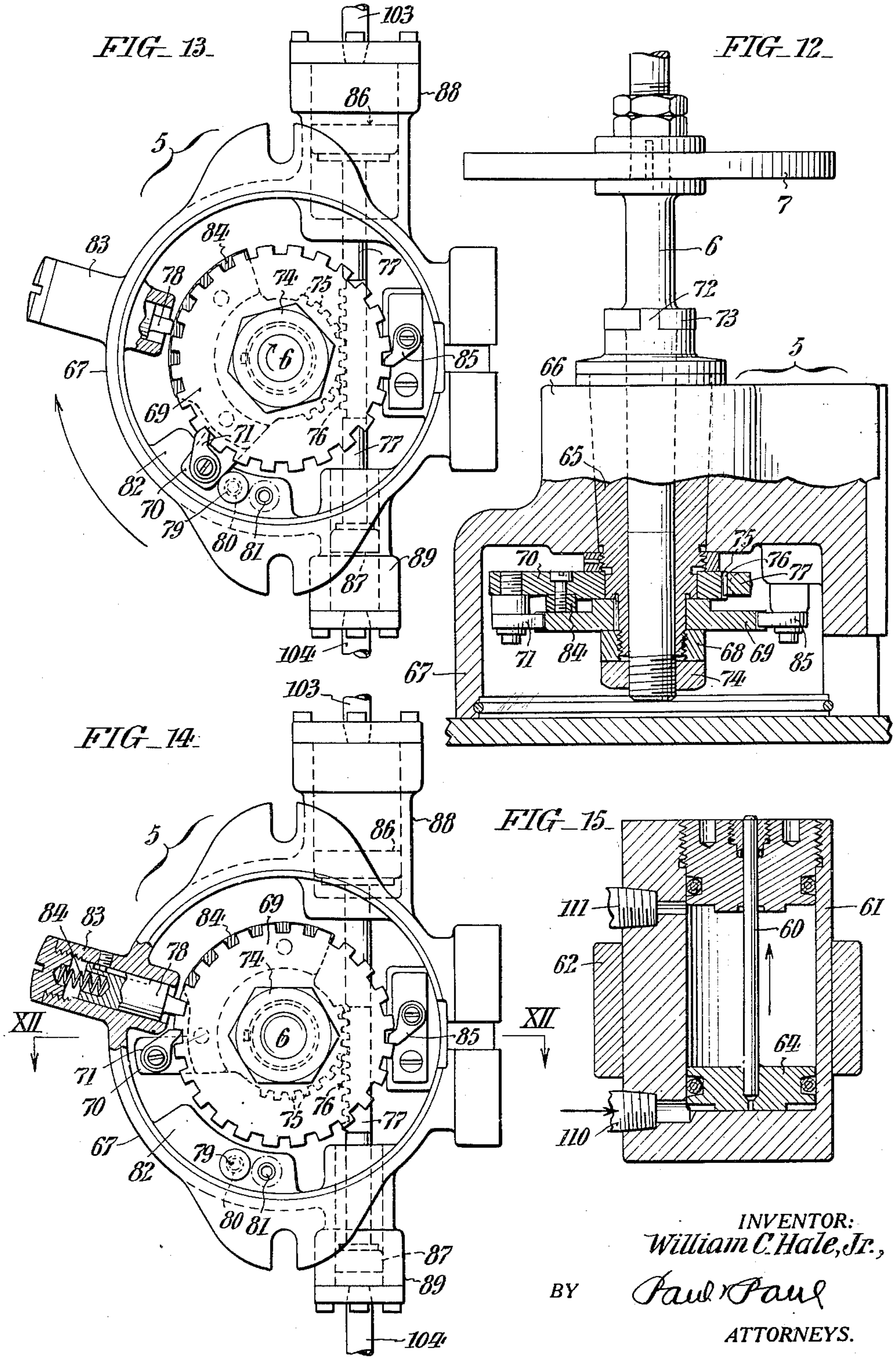
Fig. 12 is a fragmentary view partly in elevation and partly in vertical section of an indexing mechanism embodied in the machine.
Fig. 13 is an inverted plan view of the indexing mechanism with a bottom of its casing removed.
Fig. 14 is a view corresponding to Fig. 13 with parts of the indexing mechanism differently positioned.
Fig. 15 is a fragmentary view, in axial section, of the means provided for ejecting the articles after the slotting.

The indexing mechanism 5 by which the disks 7 and 10 are intermittently shifted rotatively as hereinbefore explained may be of any approved type. The one herein shown comprises, see Figs. 12–14, a sleeve 65 through which the shaft 6 of the carrier disk 7 extends axially, said sleeve being rotatively supported in a bearing 66 at the top of the housing 67 of said mechanism. Keyed to the diametrically reduced shouldered lower end of the sleeve 65 within the housing 67 and held in place thereon by a nut 68 is a ratchet wheel 69 having, in this instance, twenty-four teeth; and freely fulcrumed on said sleeve is an arm 70 with a spring-biased pawl 71 for picking the teeth of said wheel. Rotation of the shaft 6 with the sleeve 65 is insured by virtue of the engagement of a key projection 72 at the top of the latter with a notched flange 73 on the former, said engagement being maintained by a clamp nut 74 threadedly engaged upon the bottom end of said shaft and binding upon the nut 68 previously mentioned. Through engagement of gear teeth 75 thereon with rack teeth 76 on an endwise reciprocative rod 77, the pawl arm 70 is oscillated about the sleeve 65. The active stroke of the pawl arm 70 in the direction of the arrow in Fig. 13 is limited by engagement of a stop 78 with one of the notches of the ratchet wheel 69, and its retractive stroke by engagement with a stop stud 79 which can be selectively engaged in circumferentially arranged holes 80 and 81 in an arcuate web 82 internally of the housing 67. In the present instance, the stud 79 is set to allow movement of the pawl arm 70 to an extent by which the shaft 6 will be rotatively shifted, at each actuation, through an angle of 45° to correspond to the octant spacing of the apertures and notches respectively in the carrier and transfer disks 7 and 10. The stop 78 is constrained to axial movement in a radial boss 83 on the housing 67 and yieldingly urged inward by a spring 84 (Fig. 14). During the retractive strokes of the pawl arm 70, the stop 78 is depressed into the boss 83 by a segmental cam piece 84 attached by screws to said arm as shown in Figs. 12 and 13, to clear the teeth of the ratchet wheel 69 and thereby allow the same to be rotatively advanced during the next active stroke of said arm. Retrograde movement of the ratchet wheel 69 during the retractive strokes of the pawl arm 70 is prevented by the spring-biased pivoted detent shown at 85. At opposite ends, the rod 77 is provided with piston heads 86 and 87 which operate in pressure fluid cylinders 88 and 89 integrally cast with the housing 67 at opposite sides thereof as shown in Figs. 13 and 14.

For the purpose of cooling and lubricating the rivets R and the saws 30 and 31 to prevent rapid wear of the latter during the slotting, I have provided the coolant spray nozzles indicated at 90 and 91 in Figs. 4 and 5. As shown, these nozzles 90 and 91 are so positioned as to direct sprays of a fluid coolant, such as a mixture of compressed air and lubricating oil, or a water-soluble compound containing soap, wetting agent and water conditioner, at a slight upward inclination toward the carrier disk from beneath upon the saws 30 and 31 and upon the pendent shank ends of the rivets $R^3$ and $R^4$ temporarily arrested at the sawing stations D and E. In addition to effecting the cooling and lubrication, the coolant fluid serves to prevent rotation of the rivets $R^3$ and $R^4$ in the apertures of the disk 7 during transfer from one station to another. This is accomplished by a surface tension action between the head of the rivet and the supporting surfaces of the disk 7. The coolant is conducted to the nozzles 90 and 91 under pressure via a pipe 92, see Figs. 1 and 5.

The timing shaft 51 already mentioned is driven through a belt connection 93 from the output shaft 94 of a speed reducer 95 whereof the input shaft 96 is directly connected to an electric motor 97, said reducer and motor being mounted on the table top 1 at the end thereof opposite that occupied by the indexing unit 5. Affixed to the timing shaft 51 with the cam 50 are three other rotary cams 98, 99 and 100, see Figs. 1 and 20. The cam 98 is relied upon to actuate the rocker arm 101 of a valve 102 to control supply and exhaust of pressure fluid such as compressed air alternately to the cylinders 88 and 89 of the indexing unit 5 by way of connecting pipes 103 and 104; the cam 99 to actuate the operating arm 105 of a valve 106 to control supply of compressed air to the cylinders of the depressing and hold down plungers 21, 25, 55 and 56 by way of a pipe 107; and the cam 100 to actuate the operating arm 108 of a valve 109 to control supply and exhaust of compressed air to and from the cylinder 61 of the ejecting plunger 60 by way of pipes 110 and 111. Compressed air is conducted to the respective valves 102, 106 and 109 through branches 112, 113 and 114 of a main 115 from a suitable supply source, not illustrated. Interposed in the piping, as shown in Fig. 3, are a master shut off valve 116, a liquid trap 117, an oil injector 118, take-off connectors 119 and 120, and a pressure gauge and regulator 121. These various accessories are mounted on a panel plate 122 suspended from the table at one end, together with switch boxes 123 and 124 in circuit with the motors 46 and 97, electric current being supplied through a cable 125 and conducted to said motors by the leads indicated at 126 and 127 respectively.

*Operation*

At the completion of each rotative shift of the transfer disk 10, a rivet R is released from the feed chute 16 into one of the notches 15 of said disk at the station A, while another is presented at the same time at the station B for entry of its shank into one of the apertures 8 in the carrier disk 7 at the completion of the concurrent rotative shift of the latter, with three other rivets arrested at the stations C, D and E and an already slotted rivet arrested at the station F. During the instant dwell of the disks, the plungers 21, 25, 55 and 56 are lowered to depress the rivets at the stations B, C, D and E and the plunger 60 concurrently elevated at the station F to eject the already slotted rivet there, while the saws 30 and 31 are elevated to slot the rivets $R^3$ and $R^4$ at the station D and E. These events all take place during each cycle of the machine which is timed from the cam shaft 51, the cams 50, 98, 99 and 100 being so set in angular relation to one another on said shaft 51 as to cause the functions to be carried out in the proper sequence, and so designed as to determine a maximum dwell period for the disks 7 and 10 between successive rotary shifts thereof as will be apparent from diagrammatic Fig. 20. Incident to passage from the station D to the station E, the rivets will orientate through an angle of 90° during each rotative shift of the disk 7, with the result that the slots will be cut at right angles in the articles at the end opposite the heads. This orientation is also true of the grooves 53 and 54 intersecting the apertures 8 of the carrier disk 7 at the bottom, the saw 30 therefore operating in each groove 53, and the saw 31 in each groove 54. As a consequence of the construction and arrangement hereinbefore disclosed, it is possible to operate the machine at high speeds with consequent attainment of a correspondingly high output therefrom.

Figure 21:
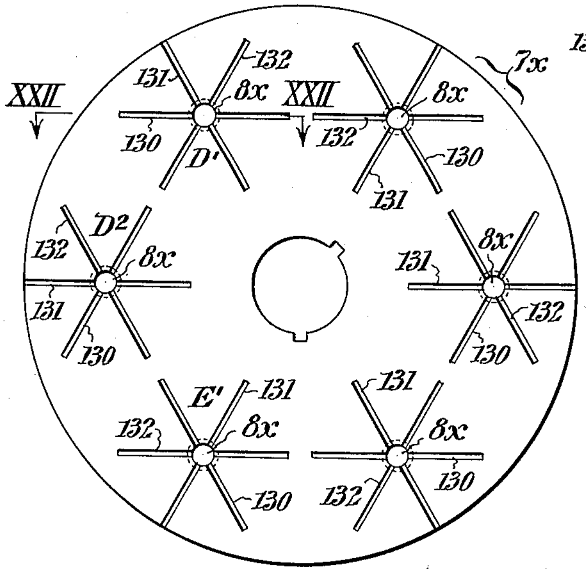
Fig. 21 is a view corresponding to Fig. 18 showing an alternative carrier disk adapted to be employed when triple cross cuts are to be made in the articles.
Figure 22:
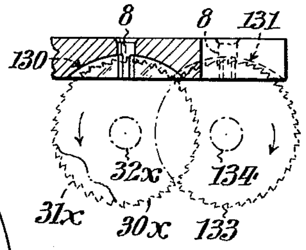
Fig. 22 is a detail view in cross section taken as indicated by the angled arrows XXII—XXII in Fig. 21.
Figure 23:
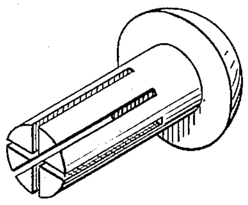
Fig. 23 shows a rivet with triple cross cuts in its shank effected with the use of the carrier disk and the means shown in Fig. 22.

In Fig. 21 there is illustrated a carrier disk 7x having six equally-spaced annularly arranged apertures 8x which can be substituted in the machine in place of the disk 7 when it is desired to cut three diagonal slots in the articles as shown in Fig. 23. Here the disk is provided in the bottom at each aperture 8x with three symmetrically arranged intersecting grooves 130, 131 and 132 for use of three saws 30x, 31x and 133 (Fig. 22) in the slotting. The saws 30x and 31x are arranged to operate in the slots 130 and 132 at the stations D′ and E′ and the saw 133 in the slots 131 at an intermediate station $D^2$. The saws 30x and 31x may be mounted, as in the first described instance, upon a common shaft 32x, and saw 133 on a separate shaft 134. It is to be understood that, in this case, a transfer disk with six equally spaced notches will be provided to cooperate with the disk 7x; that the additional saw 133 will be mounted with the others on the beam 37; that supplemental means (not shown), will be provided for driving the saw 133 from the motor 46; and that the stop 79 of the index mechanism 5 will be set to restrict the swing of the pawl arm 70 for impartation of sextant shifts to the two disks as required. A supplemental hold down means like the hold down means 55 will be provided to prevent rise of the rivets at the station $D^2$ during the sawing, and the cylinders 57 and 58 would be re-positioned for axial alignment of their plungers with the apertures 8x of the carrier disk 7x at the stations D′ and E′ in Fig. 21. The operation of the machine with the above additions and changes will be the same as before, and will result in the cutting of triple diametral slots in the articles as shown in Fig. 23.

Referring now to Figs. 24 and 25, the alternative form of carrier disk 7y there illustrated has shouldered socket apertures 8y for reception and retainment of headless articles such as securing devices S of the kind featured in the Flogaus patent hereinbefore mentioned. The disk 7y has formed in its bottom saw clearing grooves 53y and 54y at each of said apertures. The hold down plungers are in this case formed with an end portion whereof the diameter is substantially equal to that of the devices S as instanced by the hold down element designated 55y in Fig. 24. The disk 7y of Figs. 24 and 25, if provided with eight apertures, can obviously be substituted in place of the disk 7 in the machine without necessitating any changes or additions such as above described in connection with the use of the disk shown in Figs. 21 and 22.

Having thus described my invention, I claim:

1. In a milling machine for cross-slotting the shanks of articles such as rivets and the like, a horizontally disposed carrier in the form of a disk having annular series of apertures for reception from above of the shanks of the individual articles, said apertures having diameters substantially the same as the shank diameters of said articles whereby the heads of the articles make surface contact with the surface of said carrier thereby preventing rotation of the articles relative to the carrier during operation of the machine; and a pair of crossed grooves in its bottom intersecting the axis of each aperture; indexing means for intermittently rotating the disk, each time by a distance equal to the spacing of the apertures therein; means at a delivery station operative to release the articles successively for introduction of their shank ends from above into the individual apertures of the disk; a saw positioned at a station beyond the delivery station in the direction of carrier rotation; means for moving the saw upward into a groove in the disk bottom to cut a slot through the shank of a presented article in the corresponding aperture; hold down means to prevent rise of the article while it is being slotted; a second saw disposed in parallel relation to said first saw and positioned beneath the disk at another station beyond the first sawing station in the direction of disk rotation; means for moving the second saw upward into the other groove in the disk bottom corresponding to the aperture containing the article cut by the first saw, to cut a second slot in the shank of such article; a hold down means like the first mentioned hold down means at the latter station; an ejecting means at another station beyond the second sawing station in the direction of disk rotation operative to displace the cross-slotted article from the disk; and means for actuating the indexing means, the saws, the hold down means, and the ejecting means in definitely timed relation to function as aforesaid.

2. A milling machine, according to claim 1, wherein the hold down means includes a plunger, and means for depressing the plunger into engagement with the articles successively detained at the sawing station during the rest periods of the carrier disk.

3. A milling machine according to claim 1, wherein the ejecting means includes a plunger, and means for elevating the plunger to upwardly thrust the articles successively from the apertures of the disk at said station.

4. A milling machine, according to claim 1, further comprising means for cooling both the articles and the saws during the slotting.

5. A milling machine, according to claim 1, further comprising a nozzle for discharging a fluent cooling and lubricating medium upon both the articles and the saw during the slotting.

6. A milling machine, according to claim 1, further including means whereby the movement of the saw can be regulated to vary the depth of the slots cut into the articles.

7. A milling machine, according to claim 1, wherein the saw is of the rotary type and mounted on one end of a medially-fulcrumed beam; wherein a motor with a drive connection to the saw is mounted upon the other end of the beam; and wherein a rotary cam acts upon the last mentioned end of the beam from beneath to actuate the latter in raising and lowering the saw.

8. A milling machine, according to claim 1, wherein the saw is of the rotary type and mounted on one end of a medially fulcrumed beam; wherein a motor with a drive connection to the saw is mounted upon the other end of the beam; wherein a rotary cam acts upon the last mentioned end of a beam from beneath to actuate the latter in raising and lowering the saw; and means whereby the movement imparted to the beam from the rotary cam can be regulated to vary the depth of the slots cut into the articles.

9. A milling machine, according to claim 1, further comprising a constantly rotated timing shaft; and interposed connections through which the indexing means, the saw, the hold down means, and the ejecting means are respectively actuated in the proper sequence from individual rotary cams on said timing shaft.

10. A milling machine, according to claim 1, wherein the indexing means, the hold down means and the ejecting means are operated by pressure fluid cylinders, and further comprising a constantly rotated timing shaft with a plurality of rotary cams thereon, and interposed means through which the supply of motivating fluid to the cylinders of the indexing, the hold down means and the ejecting means is controlled by various of the cams, and connections through which the saw is raised and lowered by another of said cams, all in proper sequence.

11. A milling machine according to claim 1, wherein the saws are of the rotary type and mounted on the same shaft for rotation in unison to simultaneously cut the slots in the articles temporarily detained at the two sawing stations.

12. In a milling machine for cross slotting shank elements, a horizontally-disposed carrier disk with a series of uniformly-spaced apertures for reception from above and fixed retainment of the shanks of individual articles to be cross slotted from below, said apertures having diameters substantially the same as the shank diameters of said articles whereby the heads of the articles make surface contact with the surface of said carrier thereby preventing rotation of the articles relative to the carrier during operation of the machine, and with multiple intersecting grooves formed in the bottom of said disk, underlying and intersecting each aperture; indexing means for intermittently rotating the disk; means at a delivery station whereby the articles are released successively into the individual apertures from above upon presentation of the apertures to said means; a plurality of stations at intervals around the disk; saws disposed in parallel relation to each other at the respective stations movable upward into successively different slots as presented at said stations during the rest periods of the disk to concurrently cut successively different slots in the shanks held in said apertures; separate hold down means at each sawing station to prevent rise of the articles in the apertures of the disk during the sawing; an ejecting means beyond the last sawing station operative to successively displace the articles upwardly from the disk after they have been cross-slotted; and means for actuating the indexing means, the delivery means, the saws, and the ejecting means in definitely timed relation to function as aforesaid.

13. In a milling machine, a horizontally disposed transfer disk with a series of uniformly spaced notches in its periphery; means for intermittently rotating the disk; means at a feeding station for releasing an article laterally into a notch of the transfer disk at the end of each rotary shift thereof; a horizontally disposed carrier disk overlapped by and intermittently rotated in unison with the transfer disk but in the opposite direction, said carrier disk having an annular series of apertures adapted to register successively with the notches of the transfer disk at a delivery station beyond the feeding station at the termination of each intermittent rotation of the disks, and a groove intersecting each aperture at the bottom of the disk; a segmental guard with a lateral flange underreaching the transfer disk and extending from the feeding means to the edge of the carrier disk, for supporting the articles, and with an upright flange extending from the feeding means to the delivery station to confine the articles within the edge notches of the transfer disk during their transfer; a saw at a station beyond the delivery station in the direction of rotation of the carrier disk; means operated during the rest periods of the carrier disk for elevating the saw into the grooves in the bottom of said disk at the apertures successively presented to cut diametral slots in the articles in such apertures; hold down means to prevent rise of the articles in the apertures of the disk during the sawing; an ejecting means at another station further around the carrier disk beyond the sawing station concurrently operative to successively displace the slotted articles from said disk; and means for actuating the indexing means, the delivery and feeding means, the saw, the hold down means, and the ejecting means in definitely timed relation to function as aforesaid.

14. In a milling machine, a horizontally disposed carrier disk with an annularly arranged series of uniformly spaced apertures; means for intermittently rotating the disk; means at a delivery station by which headed rivets or the like are successively released upright for passage of their shanks downward into the apertures of the disk as they are successively presented to said means, said apertures having diameters substantially the same as the shank diameters of said articles whereby the heads of the articles make surface contact with the surface of said carrier thereby preventing rotation of the articles relative to the carrier during operation of the machine; a saw at a station beyond the delivery station in the direction of disk rotation; means operative during the rest periods of the disk to elevate the saw for the cutting of transverse slots in the ends of the stud shanks protruding below the disk upon successive presentation of the rivets at the latter station; a hold down means at the sawing station operative to prevent rise of the rivets in the apertures of the disk during the sawing; ejecting means at another station beyond the sawing station operative to concurrently displace the slotted rivets successively from the disk; and means for actuating the disk rotating means, the delivery means, the saw elevating means, the hold down means, and the ejecting means in definitely timed relation to function as aforesaid.

15. In a milling machine, a horizontally disposed transfer disk with a series of uniformly spaced notches in its periphery; means for intermittently rotating the disk; feeding means to which the notches of the transfer disk are successively presented for lateral entry of the shanks of successive rivets fed upright; a horizontally disposed carrier disk overlapped by and intermittently rotated with the transfer disk but in the opposite direction, said carrier disk having an annular series of apertures adapted to be registered successively with the notches of the transfer disk; a segmental guard with a lateral flange to underreach the transfer disk extending from the feeding means to the edge of the carrier disk, on which the rivets are supported with their heads elevated above said disk, and with an upright flange extending from the feeding means to the point of delivery of the rivets to confine the latter within the edge notches of the transfer disk during the transfer and to permit the rivets to drop for entry of their shanks into the apertures of the carrier disk upon registry with the notches of the transfer disk at the delivery station; means at a station beyond the delivery station in the direction of rotation of the carrier disk to fully depress the rivets upon successive presentation thereto; a saw positioned at another station beyond the depressing station further in the direction of rotation of the carrier disk; means operated during the dwells of the carrier disk for elevating the saw to cut diametral slots in the bottom ends of the rivet shanks protruding below the carrier disk; a hold down means to prevent rise of the rivets in the apertures of the carrier disk during the sawing; an ejecting means stationed beyond the saw operative to concurrently displace the slotted rivets successively from the carrier disk; and means for actuating the disk rotating means, the feeding means, the rivet depressing means, the saw and its elevating means, the hold down means, and the ejecting means in definitely timed relation to function as aforesaid.

16. In a milling machine for cross slotting the shanks of articles such as rivets and the like, a carrier in the form of a disk having an annular series of equally-spaced apertures for reception of the shanks of the articles with end portions of the shanks protruding, said apertures having diameters substantially the same as the shank diameters of said articles whereby the heads of the articles make surface contact with the surface of said carrier thereby preventing rotation of the articles relative to the carrier during operation of the machine; means for rotating the carrier; a feeding station with means for feeding the articles in succession with incidental introduction of their shank ends into the apertures in the carrier; a cutting means positioned beyond the delivery station in the direction of carrier rotation and operative to cut a transverse slot through the protruding shank portion of an article presented thereto; a second cutting means disposed in parallel relation to said first cutting means and positioned beyond the first cutting means in the direction of carrier rotation and operative upon presentation thereto of the article slotted by the first cutting means to cut through the protruding portion of the shank of such article, a second slot; a third cutting means disposed in parallel relation to said first and second cutting means and positioned beyond the second cutting means in the direction of carrier rotation and operative upon presentation thereto of the article slotted by the first and second cutting means, to cut a third slot in the shank of such article; means stationed beyond the third cutting means in the direction of carrier rotation for ejecting the finished triple-slotted article from the carrier; and means for actuating the carrier rotating means, the three cutting means and the ejecting means in definitely timed relation to function as aforesaid.

17. In a milling machine for cross slotting the shanks of articles such as rivets and the like, a carrier in the form of a disk having an annular series of equally spaced apertures for reception of the shanks of the articles with the end portions of the shanks protruding; means for rotating the carrier; a feeding station with means for feeding the articles in succession with incidental introduction of their shank ends into the apertures in the carrier; a cutting means positioned beyond the feeding station in the direction of carrier rotation and operative to cut a transverse slot through the protruding shank portion of the article presented thereto; another cutting means disposed in parallel relation to said first cutting means and positioned beyond the first cutting means in the direction of carrier rotation and operative upon presentation thereto of the article slotted by the first cutting means, to cut through the protruding portion of the shank of such article, a slot crosswise of the first slot; means positioned at another station beyond the second cutting means for ejecting the finished cross-slotted article from the carrier upon presentation at said station; and means for actuating the carrier rotating means, the feeding means, the cutting means and the ejecting means in definitely timed relation to function as aforesaid.

18. In a milling machine for cross slotting the shanks of articles such as rivets and the like, a carrier in the form of a disk having an annular series of equally spaced apertures for reception of the shanks of the articles with the end portions of the shanks protruding, said apertures having diameters substantially the same as the shank diameters of said articles whereby the heads of the articles make surface contact with the surface of said carrier thereby preventing rotation of the articles relative to the carrier during operation of the machine; means for rotating the carrier; a feeding station with means for feeding the articles in succession with incidental introduction of their shank ends into the apertures in the carrier; a cutting means positioned beyond the feeding station in the direction of carrier rotation and operative to cut a transverse slot through the protruding shank portion of the article presented thereto; another cutting means disposed in parallel relation to said first cutting means and positioned beyond the first cutting means in the direction of carrier rotation and operative upon presentation thereto of the article slotted by the first cutting means, to cut through the protruding portion of the shank of such article, a second slot; another cutting means disposed in parallel relation to said first and second cutting means and positioned beyond the second cutting means in the direction of carrier rotation and operative upon presentation thereto of the article slotted by the first two cutting means, to cut through the protruding shank of such article a third slot; means positioned at another station beyond the third cutting means for ejecting the finished triple slotted article from the carrier upon presentation at said station; and means for actuating the carrier rotating means, the feeding means, the three cutting means and the ejecting means in definitely timed relation to function as aforesaid.

References Cited in the file of this patent

UNITED STATES PATENTS

| Number | Name | Date |
|---|---|---|
| 1,010,460 | Smith | Dec. 5, 1911 |
| 1,389,308 | Jones | Aug. 30, 1921 |
| 1,434,615 | Jolls | Nov. 7, 1922 |
| 1,588,576 | Havener | June 15, 1926 |
| 1,615,538 | Ehrman | Jan. 25, 1927 |
| 1,860,840 | Marsilius | May 31, 1932 |
| 1,893,509 | Stimpson | Jan. 10, 1933 |
| 1,920,108 | Rossmann | July 25, 1933 |
| 1,938,939 | Smith | Dec. 12, 1933 |